(12) United States Patent
Harmon (10) Patent No.: US 11,009,427 B2
(45) Date of Patent: May 18, 2021

(54) REAL-TIME CORRECTION OF VEHICLE LOAD CURVE FOR DYNAMOMETER TESTING, AND ASSOCIATED SYSTEMS AND METHODS

(71) Applicant: PACCAR Inc, Bellevue, WA (US)

(72) Inventor: Charles J. Harmon, Bellingham, WA (US)

(73) Assignee: PACCAR INC, Bellevue, WA (US)

( * ) Notice: Subject to any disclaimer, the term of this patent is extended or adjusted under 35 U.S.C. 154(b) by 356 days.

(21) Appl. No.: 15/783,691

(22) Filed: Oct. 13, 2017

(65) Prior Publication Data
US 2019/0113416 A1    Apr. 18, 2019

(51) Int. Cl.
| | |
|---|---|
| *G01M 17/007* | (2006.01) |
| *G07C 5/08* | (2006.01) |
| *G05D 23/19* | (2006.01) |
| *F24F 11/30* | (2018.01) |
| *F24F 110/32* | (2018.01) |
| *F24F 110/00* | (2018.01) |

(52) U.S. Cl.
CPC .......... *G01M 17/007* (2013.01); *F24F 11/30* (2018.01); *G05D 23/19* (2013.01); *G07C 5/0808* (2013.01); *F24F 2110/00* (2018.01); *F24F 2110/32* (2018.01)

(58) Field of Classification Search
CPC .... G01M 17/007; F24F 11/30; F24F 2110/32; F24F 2110/00; G07C 5/0808; G05D 23/19
See application file for complete search history.

(56) References Cited

U.S. PATENT DOCUMENTS

| | | | | |
|---|---|---|---|---|
| 5,686,651 | A * | 11/1997 | Hur | G01M 9/00 73/9 |
| 2012/0197504 | A1* | 8/2012 | Sujan | G01C 21/3469 701/70 |
| 2015/0332520 | A1* | 11/2015 | Komada | G01M 17/007 701/29.1 |
| 2015/0332522 | A1* | 11/2015 | Komada | G01M 17/007 701/29.1 |
| 2017/0268948 | A1* | 9/2017 | List | G01L 5/13 |
| 2018/0033217 | A1* | 2/2018 | Komada | G07C 5/0841 |
| 2018/0040176 | A1* | 2/2018 | Ogawa | G01M 17/007 |
| 2019/0113416 | A1* | 4/2019 | Harmon | G01M 17/007 |
| 2019/0318051 | A1* | 10/2019 | Oswald | G01M 17/00 |

OTHER PUBLICATIONS

Wikipedia, Troubleshooting, 2017 (Year: 2017).*

(Continued)

*Primary Examiner* — Alan D Hutchinson (57) ABSTRACT

Real-time correction of vehicle load curve for dynamometer testing, and associated systems and methods are disclosed herein. In one embodiment, a method for replicating an on-road performance and/or a failure of a road vehicle in a test facility includes applying a load curve to a controller of the test facility and testing a test vehicle in the test facility using the load curve. The method also includes verifying whether the performance/failure is replicated on the test vehicle, and if the performance/failure is not replicated, changing at least one parameter in the load curve.

21 Claims, 5 Drawing Sheets

(56) References Cited

OTHER PUBLICATIONS

ETA-HTP01, Revision 2, Implementation of SAE Standard J2263, "Road Load Measurement Using Onboard Anemometry and Coastdown Techniques" Electric Transportation Applications, Feb. 1, 2008, 17 pages.

United States Environmental Protection Agency, Determination and Use of Vehicle Road-Load Force and Dynamometer Settings, Feb. 23, 2015, 10 pages.

* cited by examiner

REAL-TIME CORRECTION OF VEHICLE LOAD CURVE FOR DYNAMOMETER TESTING, AND ASSOCIATED SYSTEMS AND METHODS

BACKGROUND

Tractors, tractor/trailer combinations, light trucks, passenger cars, etc. (collectively, "vehicles") are often characterized in the field to determine their load characteristics. An example of such vehicle characterization is described in SAE Standard J2263: "Road Load Measurement Using Onboard Anemometry and Coastdown Techniques," which provides a procedure for the coastdown test. The SAE J2263 Recommended Practice prescribes accelerating the vehicle to a speed of about 78 mph or higher, followed by shifting the transmission into neutral, and releasing the accelerator pedal to place the vehicle into the coastdown regime. As a result, the vehicle starts slowing down due to the energy losses associated with the moving vehicle, which, on a flat road, change with the speed (e.g., energy losses that are a function of the square of velocity dominate for high speeds). After the vehicle slows down to a low speed, constant frictional losses start to dominate the overall energy losses. The test ends when the vehicle speed is reduced to about 9 mph. The test is repeated in the opposite direction to cancel the influence of the road incline, headwind and/or tailwind, and the cycle is repeated several times to come up with the average coastdown results. The resulting load curve (also referred to as "road-load equation," "road-load curve," "load-vs-speed curve" or "load curve") is expressed as a polynomial having the vehicle's velocity as the variable.

In general, the energy losses of the vehicle can be expressed as a second order polynomial of the vehicle's velocity. As an acceptable approximation, the rolling resistance dominates the linear (the first-order) term in the polynomial, and the drag resistance dominates the second-order term in the polynomial. At relatively high and steady velocity, typically referred to as "highway driving," the air drag often dominates energy losses of the vehicle. The air drag force ($F_D$) on the tractor/trailer combination is:

$$F_D = C_D \tfrac{1}{2} \rho v^2 A \quad (1)$$

where $C_D$ is a drag coefficient, $\rho$ is the density of air, v is the velocity of the vehicle, and A is the frontal projection area of the vehicle.

Figure 1:
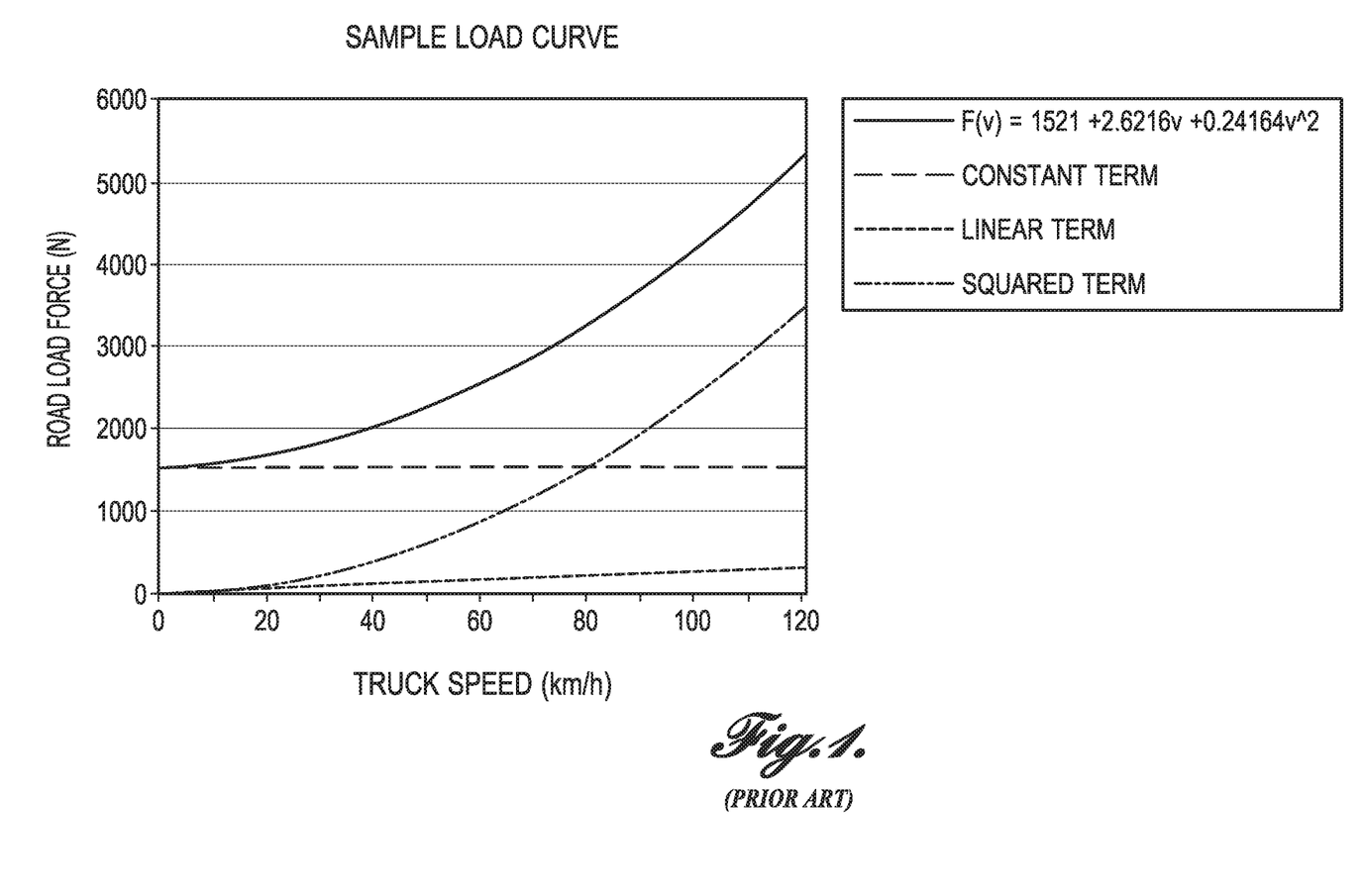
FIG. 1 is a graph of a load-curve in accordance with conventional technology.

FIG. 1 is a graph of a load-curve obtained in accordance with conventional technology. This exemplary load-curve was developed for a Class 8 commercial tractor/trailer combination using the SAE J2263 standard. The exemplary load curve includes the constant, linear, and square terms, which in combination yield:

$$F(v) = 1521 + 2.6216v + 0.24164v^2 \quad (2)$$

where F is the road load force in N, and v is the velocity of the tractor in km/h. In some embodiments, in addition to the above-described contribution to the load curve, the load curve can also include loads caused by the road grade and vehicle acceleration/deceleration.

When the vehicle 10 fails in the field, sometimes it is desirable to replicate the failure or particular performance of the vehicle using another vehicle in the field or in a test facility, especially if the failure/performance mode is less understood or novel to personnel investigating the failure. For example, the "failure" may be a false failure indicated by the vehicle (e.g., a failed diagnostic signal). In some situations, the false failure may be especially confusing and difficult to deal with for the operator and/or the personnel that investigate such failures.

Generally, the field failures and/or the field performance can be replicated using the same type of vehicle that is either driven under similar conditions in the field, or tested in a test facility. Each of the two approaches may require that the environmental conditions pertinent to the failure/performance in the field match those of the test vehicle. However, the load curves derived from the SAE standards sometimes do not correspond to the real environmental conditions at the time of failure or specific performance, as explained with reference to FIG. 2 below.

Figure 2:
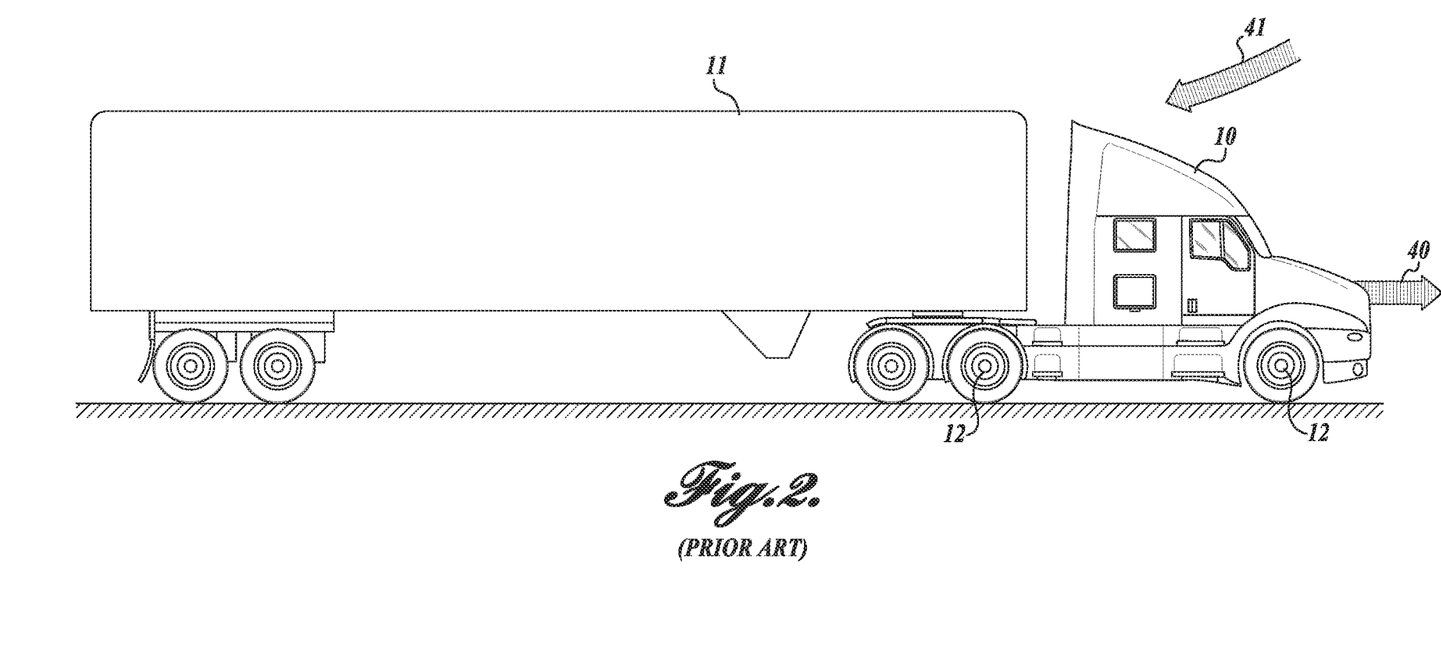
FIG. 2 is a side plan view of a vehicle in accordance with conventional technology.

FIG. 2 is a side plan view of a tractor/trailer combination 10/11 in accordance with conventional technology. The tractor/trailer combination 10/11 ("test vehicle") corresponds to the type of tractor/trailer combination that failed in the field ("road vehicle"). To replicate the failure/performance in the field, the test vehicle may be run at a velocity 40 corresponding to the velocity of the road vehicle at the time of failure over a similar stretch of road simulated by the test facility dynamometers. For example, a test profile of the test facility may replicate the vehicle speed and simulated road grades to match the conditions in the field at the time of the vehicle failure. However, the vehicle velocity is not the only condition that determines the loading of the tractor/trailer combination 10/11. For example, at the time of failure, the road vehicle may have been subjected to a wind 41, for example a headwind that increases the effective loading of the vehicle, or a tailwind that decreases the effective loading of the vehicle. Furthermore, the temperature of air and/or elevation of the test site can change the density of air, which also impacts the road load force and the overall loading of the engine.

The SAE Recommended Practices offer limited guidance for adjusting the coefficients in the load curve in the non-standard test conditions, and those recommendations are often insufficient to account for the range of the driving conditions in the field. For example, SAE Recommended Practices J2264 recommends simply multiplying each coefficient of the load curve by 1.1 when tests are run at 20° F. (−7° C.) to account for the increased density of air, rolling resistance, and constant losses encountered at lower temperatures, while providing no guidance for corrections at other non-standard ambient temperatures, or corrections due to other variables, such as altitude, headwind, tailwind, or crosswind. As a result, vehicle performance, including part and/or diagnostic failures can be difficult to correlate using the test vehicle under many realistic conditions, either in the field or in the test facility. Accordingly, there remains a need for systems and methods for accurately replicating vehicle field failure/performance, and, more generally, for optimizing ambient-condition inputs for vehicle correlation testing between the test facility and the field.

SUMMARY

This summary is provided to introduce a selection of concepts in a simplified form that are further described below in the Detailed Description. This summary is not intended to identify key features of the claimed subject matter.

In one embodiment, a method for replicating an on-road performance or a road failure of a road vehicle in a test facility includes: applying a load curve to a controller of the test facility; testing a test vehicle in the test facility using the load curve; verifying whether the performance or failure observed on the road is replicated on the test vehicle; and if the performance or failure is not replicated, changing at least one parameter in the load curve.

In one aspect, the at least one parameter is a velocity of the road vehicle, and changing at least one parameter includes replacing the velocity of the road vehicle with a relative velocity of the road vehicle with respect to still air.

In another aspect, the at least one parameter is a velocity of the road vehicle, and changing at least one parameter includes adjusting a second-order term C to account for a relative velocity of the road vehicle with respect to still air.

In another aspect, the at least one parameter is a density of air, and changing at least one parameter includes replacing a second-order term C with an adjusted second-order term C to account for a non-standard ambient air density.

In another aspect, the density of air is at least in part determined based on elevation of a road driven by the road vehicle.

In another aspect, the density of air is at least in part determined based on the ambient temperature(s) through which the test vehicle is driven.

In one aspect, the dynamometers of the test facility are controlled with a controller.

In another aspect, a velocity of air at the test facility is controlled with the controller.

In another aspect, a temperature of air at the test facility is controlled with the controller.

In one embodiment, a test facility for vehicles includes: at least one dynamometer for engaging with tires of a test vehicle; a controller for controlling the at least one dynamometer based on a load curve; and an input file having at least one adjusted parameter for the load curve. The controller may be configured to receive the adjusted parameter if an on-road performance or a road failure is not replicated by the test vehicle, or at any time deemed appropriate by the test conductor—for example, to optimize correlation between facility- and road-test data.

In one aspect, the test facility includes a supply of air over some or all of the test vehicle, while the velocity of air in the test facility is changeable based on the at least one adjusted parameter.

In another aspect, a source of climate-controlled air is set to change a temperature of supplied air in the test facility based on the at least one adjusted parameter.

In another aspect, the at least one adjusted parameter is a relative velocity of a road vehicle with respect to still air.

In another aspect, the at least one adjusted parameter is a density of air.

In another aspect, the at least one adjusted parameter is a constant term A corresponding primarily to constant frictional losses or a first-order term B corresponding primarily to a rolling resistance.

In another aspect, the at least one adjusted parameter is a second-order term C corresponding primarily to a drag force.

DESCRIPTION OF THE DRAWINGS

The foregoing aspects and many of the attendant advantages of the claimed subject matter will become more readily appreciated as the same are understood with reference to the following detailed description, when taken in conjunction with the accompanying drawings, wherein:

DETAILED DESCRIPTION

While illustrative embodiments have been illustrated and described, it will be appreciated that various changes can be made therein without departing from the spirit and scope of the claimed subject matter. Briefly, the inventive technology is directed to improved replication of vehicle performance in the field and/or a field failure of a vehicle (e.g., a tractor/ trailer combination) using a test vehicle or a chassis dynamometer facility (also referred to as a "test facility"). In some embodiments, the load curve used in the test facility is adjusted to more precisely correlate to the real load conditions in the field. For example, the coefficients (also referred to as terms or parameters) for the load curve used in the test facility can be adjusted to account for the variations in, for example, temperature, altitude, air density, headwind, tailwind, and/or crosswind (also referred to as parameters) experienced by the truck in the field. In addition, the load-curve variable, velocity, can be offset by either a constant or variable value to account for constant or variable head/tail/crosswind, respectively.

Figure 3:
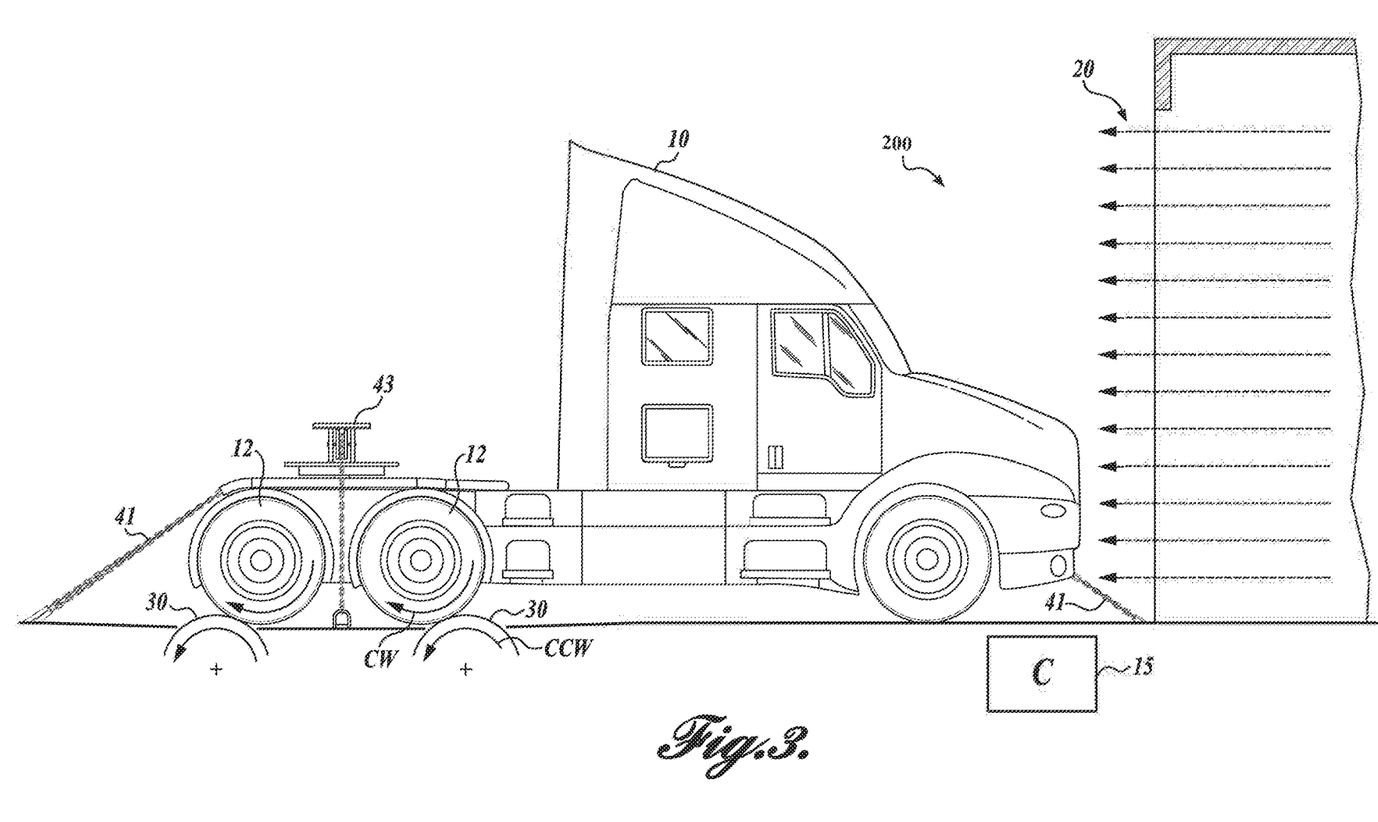
FIG. 3 is a side plan view of a vehicle testing in accordance with an embodiment of the present technology.

FIG. 3 is a side plan view of a tractor testing in accordance with an embodiment of the present technology. The tractor 10 (also referred to as "test vehicle") can be tested in a climactic wind tunnel (test facility) 200. In some embodiments, wheels 12 on the drive axles engage with dynamometers 30. In other embodiments, the wheels 12 on the non-drive axles may also engage with the dynamometer(s) 30. As the tractor engine rotates the wheels 12 in the clockwise (CW) direction, the dynamometers 30 provide the counter-torque in the counterclockwise (CCW) direction to balance the torque of the tractor engine. The counter-torque of the dynamometers may be controlled by a controller 15. In some embodiments, the controller 15 includes the load-curves obtained by the vehicle characterization in the field, for example using the SAE Standard J2263. In some embodiments, the controller 15 may be a general purpose computer, a special-purpose computer, application specific integrated circuit (ASIC), analog controller, digital controller or other data processor.

In some embodiments, the test facility 200 may also include a source of air to blow air 20 at prescribed velocity and/or temperature (if the source of air is capable of climate-controlling the air) to approximate real use conditions of the tractor 10. For example, the Environmental Protection Agency (EPA) specifies a thaw test for diesel emission fluid (DEF) is run at −18° C. To better replicate such a test in the test facility, the climatic wind tunnel 200 may blow air 20 at −18° C. toward the tractor 10, while the controller 15 applies required load curves to the dynamometers 30. In some embodiments, the speed of the supplied airflow at the nozzle exit may match the wheel-based speed of the test vehicle. The tractor 10 may be secured in place by a brace 43 and ties 41.

In some embodiments, the load curves (e.g., Eq. 2) used by the controller 15 may not correctly represent the load conditions for the tractor that failed in the field. Many standardized tests require multiple test runs in the opposite directions on the test track, therefore annulling or at least reducing the effects of the headwind, tailwind, or crosswind, unlike with the tractor that experienced a failure in the field. However, in some use conditions, for example when the tractor 10 travels against a headwind, the engine loading, fuel dosing, DEF dosing, engine temperature, etc., may be significantly different from what they would be if there were no headwind, resulting in significant changes in vehicle performance, potentially including system, component, or diagnostic failures, that would not occur if there were no headwind. In some cases, a false failure message may be generated due to the mismatch between the load curves and the real road conditions. Next, when testing an equivalent tractor in the test facility 200, a particular failure may not be replicable because the load curves used by the controller 15 do not account for the real conditions that the failed truck experienced in the field. Some examples of the mismatch between the field and test conditions are explained with reference to Tables 1 and 2 below.

Table 1 lists several combinations of the ground speed and headwind for the Class 8 commercial tractor/trailer combination, the load curve for which is provided in Equation (1). The headwind increases drag force on the tractor/trailer because the effective velocity of the tractor/trailer is increased with respect to still air. In turn, the real loading of the engine also increases, while not being accounted for by the load curves. In some embodiments, the unaccounted-for loads on the tractor may be significant. For example, with the aforementioned tractor/trailer combination, the tractor traveling at 50 km/h against the headwind of 20 km/h experiences 96% higher drag force and 26% higher overall loading of the engine in comparison to the same tractor that travels at 50 km/h with no headwind. As another example, the tractor travelling at 110 km/h against the 20 km/h headwind experiences 40% higher drag force and 25% higher engine loading. In some embodiments, these increased engine loads (or decreased engine loads in the case of tailwind) may significantly alter behavior of the engine and/or control systems of the engine, such that the subsequent testing using the load curves in the test facility 200 do not replicate the failures or the real performance of the vehicle under the road conditions.

TABLE 1

Effect of Headwinds on Class 8 commercial tractor/trailer combination drag force and overall vehicle load at selected vehicle ground speeds.

| Ground Speed | Head-wind (km/h) | % Change, Drag | % Change, Overall |
|---|---|---|---|
| 50 | 20 | 96 | 26 |
| 50 | 30 | 156 | 42 |
| 80 | 20 | 56 | 27 |
| 80 | 30 | 89 | 42 |
| 110 | 20 | 40 | 25 |
| 110 | 30 | 62 | 38 |

Table 2 lists several combinations of the altitude and the ambient temperature, in combination resulting in different densities of air. The last column in Table 2 shows a relative density of air with respect to the SAE J2263-defined nominal case of 98.21 kPa ambient air pressure (29.00 in Hg, equivalent to an altitude of about 275 m (902 ft) in the standard atmosphere model) and the SAE J2263-defined nominal ambient temperature of 293 K. For example, at a relatively high altitude of 12,000 ft and a relatively moderate temperature of 293 K, the density of air is only 66% of that for the SAE nominal case. In general, lower density of air reduces the drag force and, correspondingly, the loading of the tractor engine as a linear factor, as shown in Eq. 1. Furthermore, a lower density of air may also reduce the cooling of engine, may result in a leaner combustion mixture, and/or cause other effects. Therefore, the load curves that were obtained at or corrected to, for example, the above nominal conditions, may be incorrect when attempting to replicate the field failure and/or the on-road performance of the truck at higher altitude and/or different temperature. Additionally, fog and/or precipitation conditions may further reduce the correspondence between conditions in the field and the test facility.

TABLE 2

Range of realistic outer bounds of ambient conditions on North American roads.

| Condition/Altitude | Ambient Temperature | Ambient Pressure (kPa) | Relative Air Density (SAE nominal case = 1.00) |
|---|---|---|---|
| SAE nominal case | 293 | 98.21 | 1.00 |
| Low temp, sea level, high barometric pressure | 233 | 105.0 | 1.34 |
| High temp, sea level, nominal barometric pressure | 323 | 100.0 | 0.92 |
| Low temp, 12,000 ft, nominal barometric pressure | 243 | 64.5 | 0.79 |
| Moderate temp, 12,000 ft, nominal barometric pressure | 293 | 64.5 | 0.66 |

Figure 4:
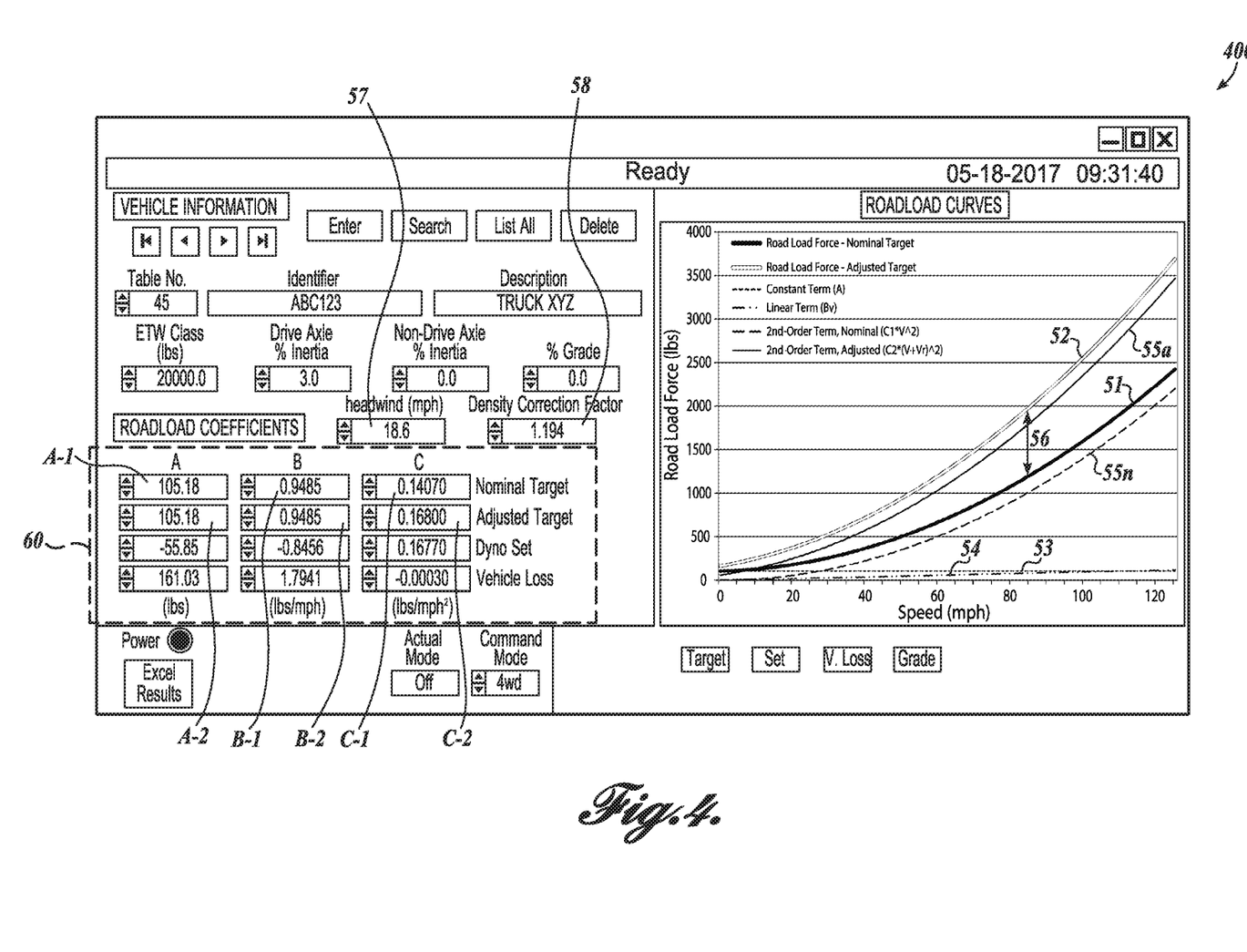
FIG. 4 is a screenshot of vehicle testing software in accordance with embodiments of the present technology.

FIG. 4 is a screenshot of a tractor testing software in accordance with embodiments of the present technology. FIG. 4 shows a graph with the load curves 51 and 52 that are the second order polynomials. In some embodiments, the load curve 51 combines a constant term (e.g., the "A" terms in a frame 60 or a constant curve 53 in the graph, corresponding to constant frictional losses), a linear term (e.g., the "B" terms in the frame 60 or a linear curve 54, corresponding mainly to the rolling resistance), and a quadratic term (e.g., the "C" terms in the frame 60 or a quadratic curve 55, corresponding mainly to the drag force). The A, B, and C terms are also respectively referred to as constant, first-order, and second-order terms or coefficients.

The illustrated load curve 51 may be obtained as described in, for example, the SAE Standard J2263. Therefore, the load curve 51 generally does not include the effects of the headwind, tailwind, or crosswind, or the effects of different air density. Therefore, applying the load curve 51 to the controller 15 of the dynamometers 30 may lead to a mismatch between the conditions of the truck in the field and the truck in the test facility.

The load curve 52 corresponds to a setting of the dynamometer 30. The setting may be at least partially derived from the SAE Recommended Practices J2264. In some embodiments, the load curve 52 can represent a more realistic load curve, because the load curve 52 takes into account the drive conditions of the truck that exhibited certain performance or experienced the failure in the field. For example, density of air in the load curve 52 may be adjusted to correspond to that of the truck that experienced the failure or had certain performance in the field, as opposed to the standard SAE value of the air density. In some embodiments, the density of air may be derived from the perfect gas law as:

$$\rho = p/RT,$$

where p is the air pressure, R is the universal gas constant and T is the temperature on absolute scale. If the air pressure (p) is not provided by the truck instrumentation, the air pressure may be derived by using, for example, standard atmosphere models for known elevation.

In some embodiments, coefficients (terms, parameters) A to C in the frame 60 may be adjusted to generate the load curve corresponding to the use conditions in the field. For example, the coefficient C may be changed to account for the differences in the density of air (causing differences in the drag force) and/or the coefficient B may be changed to account for the differences in the roughness of the road, or different tires, or different outside temperature (causing different pressure and rolling resistance of the tire), or overinflating/underinflating the tires (causing differences in the rolling resistance). The coefficient A may be changed to account for different ambient temperatures, because even when the SAE standards account for low temperature, only one adjustment is given for a range of conditions, therefore not accounting for a range of conditions that the vehicle may experience in the field.

Furthermore, when the tractor that failed or specifically performed in the field was subjected to the headwind, the velocity of the tractor, which is the variable in the load curve 51, may be replaced with a relative velocity $v_r$, where:

$$v_r = v_{tractor} + v_{headwind}$$

or $$v_r = v_{tractor} - v_{tailwind}$$

In the illustrated example, the nominal target road-load equation 51 is:

$$F(v) = 105.18 + 0.9485v + 0.14070v^2$$

The second-order term C for the nominal case is illustrated by curve 55n. In this case, the adjustments should take into account higher density of air and 18.6 mph headwind. The correction for the C term based on a density correction factor 58 of 1.194 is based on $-20°$ C. ambient temp, 101.3 kPa (standard sea-level) ambient pressure. Therefore, the C term in adjusted target road-load equation is:

$$(0.14070)(1.194) = 0.16800.$$

When a headwind 57 of 18.6 mph is also taken into account, the adjusted target road-load equation becomes:

$$F(v) = 105.18 + 0.9485v + 0.16800(v + 18.6)^2.$$

The second-order term C for the adjusted case is illustrated by curve 55a. In this case, the constant term A and the first-order term B did not change, but in other embodiments the constant term A and/or the first-order term B may also change. Cumulatively, the adjustments result in a shift 56 from the load curve 51 to the load curve 52.

In some embodiments, the field conditions applicable to the tractor that experienced failure or had a specific on-road performance can be obtained from the meteorological reports, local weather stations, estimates based on the altitude, or estimates based on the historical data. In some embodiments, these field conditions may be communicated to the test facility 200 in real time, for example over the internet and/or wirelessly.

In some embodiments, a timeline of the environmental conditions may be recorded as the vehicle operates in the field. The timeline may include outside temperature, air pressure, road elevation, precipitation, etc. When an equivalent vehicle is tested in a test facility, the timeline may be replicated by adjusting, for example, A, B and C coefficients for the dynamometers. For example, air density and pressure generally decreases as the elevation increases, corresponding to a decreased quadratic term in the load curves.

Figure 5:
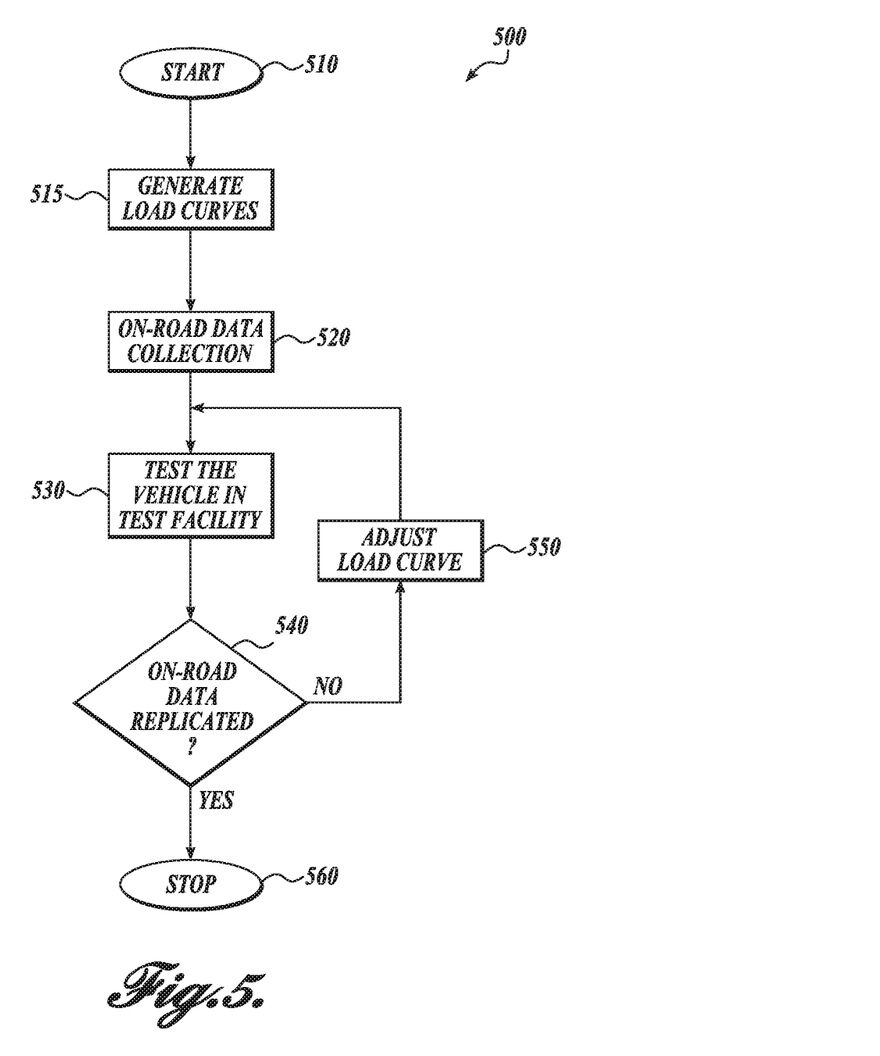
FIG. 5 is a flowchart of a method for replicating field failures in a test facility in accordance with an embodiment of the present technology.

FIG. 5 is a flowchart of a method 500 for replicating field failures or truck performance in a test facility in accordance with an embodiment of the present technology. In some embodiments, the method may include additional steps or may be practiced without all steps illustrated in the flow chart.

The method starts in step 510, and continues to step 515. In step 515, the load curves are generated for a particular type of vehicle. In some embodiments, the load curves are generated using the SAE recommended practices, for example the SAE Standard J2263. In some embodiments, the load curves may be the second order polynomials with respect to vehicle speed.

In step 520, the on-road data are collected. The on-road data may be related to the truck failure or specific performance in the field. The conditions relevant to the failure/performance (e.g., air temperature, precipitation, intensity of the wind, direction of the wind, road incline, etc.) may be obtained and recorded. In some embodiments, a timeline of the environmental conditions may be recorded as the vehicle operates in the field.

In step 530, a vehicle comparable to the one used in the field is tested in a test facility. In some embodiments, the load curves obtained in step 515 are used to generate proper torque on the dynamometers, air velocity and temperature at the outlet of the wind tunnel, and/or other test conditions.

In step 540, a determination is made whether the failure is replicated. If the failure/performance is not replicated, the load curve can be adjusted in step 550. For example, the second-order term C may be adjusted by adjusting the air density to correspond more closely to that experienced by the failed truck in the field. In some embodiments, the relative velocity may be used instead of the vehicle velocity in the load curves. In some embodiments, the road incline may be adjusted by adjusting the constant term in the load curve. In some embodiments, these adjustments may be implemented in the controller of the dynamometer system. In some embodiments, the adjustments may be implemented as updated entries in a pre-test data sheet (or similar input) for the control system of the dynamometers and/or wind tunnel. The method ends in step 560.

Many embodiments of the technology described above may take the form of computer-executable or controller-executable instructions, including routines executed by a programmable computer or controller. Those skilled in the relevant art will appreciate that the technology can be practiced on computer/controller systems other than those shown and described above. The technology can be embodied in a special-purpose computer, application specific integrated circuit (ASIC), controller or data processor that is specifically programmed, configured or constructed to perform one or more of the computer-executable instructions described above. Of course, any logic or algorithm described herein can be implemented in software or hardware, or a combination of software and hardware.

From the foregoing, it will be appreciated that specific embodiments of the technology have been described herein for purposes of illustration, but that various modifications may be made without deviating from the disclosure. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Accordingly, the disclosure can encompass other embodiments not expressly shown or described herein.

The embodiments of the invention in which an exclusive property or privilege is claimed are defined as follows:

1. A method for replicating an on-road failure of a road vehicle in a test facility, comprising:
applying a standard load curve to a controller of the test facility;
testing a test vehicle in the test facility using the standard load curve, wherein the standard load curve comprises an equation to determine a load to apply to the test vehicle as a function of vehicle velocity;
verifying whether the failure observed on the road is replicated on the test vehicle using the standard load curve; and
when the failure is not replicated, iteratively changing at least one parameter in the standard load curve to produce one or more updated load curves until the failure is replicated on the test vehicle.

2. The method of claim 1, wherein the at least one parameter is a velocity of the road vehicle, wherein changing the at least one parameter includes replacing the velocity of the road vehicle with a relative velocity of the road vehicle with respect to still air.

3. The method of claim 1, wherein the at least one parameter is a velocity of the road vehicle, wherein changing the at least one parameter includes adjusting a second-order term C to account for a relative velocity of the road vehicle with respect to still air.

4. The method of claim 1, wherein the at least one parameter is a density of air, wherein changing the at least one parameter includes replacing a second-order term C with an adjusted second-order term C.

5. The method of claim 4, wherein the density of air is at least in part determined based on a temperature of air experienced by the road vehicle.

6. The method of claim 4, wherein the density of air is at least in part determined based on elevation of a road driven by the road vehicle.

7. The method of claim 1, further comprising controlling dynamometers of the test facility with the controller.

8. The method of claim 1, further comprising controlling a velocity of air at the test facility with the controller.

9. The method of claim 1, further comprising controlling a temperature of air at the test facility with the controller.

10. The method of claim 1 further comprising applying a timeline of field data to change the at least one parameter in the standard load curve in the test facility.

11. A test facility for vehicles, comprising:
at least one dynamometer configured to engage with tires of a test vehicle;
a controller configured to control the at least one dynamometer based on a standard load curve, wherein the standard load curve comprises an equation to determine a load to apply to the test vehicle as a function of vehicle velocity; and
an input file having at least one adjusted parameter for the standard load curve to produce an updated load curve,
wherein the controller is configured to receive the at least one adjusted parameter when an on-road failure is not replicated by the test vehicle and to iteratively receive at least one additional adjusted parameter to produce one or more updated load curves until the failure is replicated.

12. The test facility of claim 11, further comprising:
a supply of air directed over some or all of the test vehicle, wherein a velocity of air in the test facility is changeable based on the at least one adjusted parameter.

13. The test facility of claim 11, further comprising:
a source of climate-controlled air configured to change a temperature of supplied air in the test facility based on the at least one adjusted parameter.

14. The test facility of claim 11, wherein the at least one adjusted parameter is a relative velocity of a road vehicle with respect to still air.

15. The test facility of claim 11, wherein the at least one adjusted parameter is a second-order term C.

16. The test facility of claim 15, wherein the adjusted second-order term C is derived based on a relative velocity of a road vehicle with respect to still air.

17. The test facility of claim 11, wherein the at least one adjusted parameter is a density of air.

18. The test facility of claim 17, wherein the density of air is at least in part determined based on ambient temperature.

19. The test facility of claim 17, wherein the density of air is at least in part determined based on elevation of a road driven by a road vehicle.

20. The test facility of claim 11, wherein the at least one adjusted parameter is a constant term A corresponding to constant frictional losses or a first-order term B corresponding to a rolling resistance.

21. The test facility of claim 11, wherein the at least one adjusted parameter is a second-order term C corresponding to an aerodynamic drag force.

* * * * *